Figure 1:
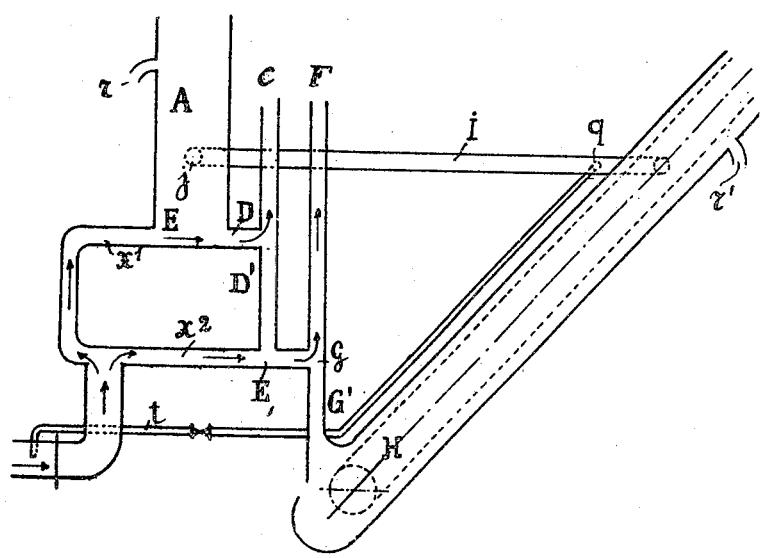

Aug. 14, 1923.

1,464,843

M. CROQUET
PROCESS AND PLANT FOR SORTING, WASHING, OR CLASSIFYING MIXED MATERIALS
OF DIFFERENT SPECIFIC GRAVITIES OR VOLUMES
Filed Jan. 16, 1922

Inventor:
Marcel Croquet,
per, J. Severn
Attorney.

Patented Aug. 14, 1923.

1,464,843

UNITED STATES PATENT OFFICE.

MARCEL CROQUET, OF MONTIGNY-LE-TILLEUL, BELGIUM.

PROCESS AND PLANT FOR SORTING, WASHING, OR CLASSIFYING MIXED MATERIALS OF DIFFERENT SPECIFIC GRAVITIES OR VOLUMES.

Application filed January 16, 1922. Serial No. 529,506.

*To all whom it may concern:*

Be it known that I, MARCEL CROQUET, a subject of the King of the Belgians, residing at Montigny-le-Tilleul, Belgium, have invented a certain improved process and plant for sorting, washing, or classifying mixed materials of different specific gravities or volumes, of which the following is a specification.

The invention relates to a process and plant for sorting, washing or classifying mixed materials of different volumes or specific gravities.

It consists in using one or more streams of water of adjustable velocity and volume, passing under pressure successively under and above still or "sleeping" columns of water, and evacuated in an upward direction by means of suitable conduits the water level of the different parts of the plant being kept constant by compensation.

The said invention puts to practical use the well known phenomenon according to which bodies of equal volume placed in a stream are conveyed by the said stream in inverse proportion to their specific gravity, and, placed in the same conditions, the bodies of equal specific gravity but of different shape or volume are also differently influenced. The invention also applies to the arrangements of apparatus for carrying out the aforesaid process and for the adaptation of the principle thereof to the treatment of various materials.

The materials to be washed or sorted, previously classified in categories according to volume or not, mixed with water or not, are fed to a column of water with compensated level, and they sink with as little velocity as possible and are simultaneously separated, until they reach the lower portion of the said column, at which point the latter is crossed by a stream of water of which the constant velocity is adjusted in such a manner that the bodies of a predetermined maximum specific gravity and under are carried off by the stream while the bodies of higher specific gravity are conveyed on the bottom of the conduit.

The bodies which are carried off move together with the stream and are evacuated from the apparatus together with the latter in an upward direction, and they are then collected in a trough. The bodies conveyed on the bottom of the conduit sink when passing over the mouth of a column of still or "sleeping" water, and when they have reached the lower portion of the said column they are directed towards a collecting vessel from which they are removed through the medium of a bucket elevator or like mechanical means.

The column to which the materials are fed on the one hand and the collecting vessel on the other hand constitute two vessels which are in communication both at the top and at the bottom; the water level is thus constant owing to compensation, which makes it possible to secure a perfect stillness of the intermediate column which, while forming a wall for the conduit of the stream at the point where it opens out into the latter, allows the conveyed bodies to pass. The process may be carried out in a number of ways, and the sorting may take place once only or be repeated; by combining variations of velocities at certain points of the streams, or by employing a plurality of streams, it is possible to obtain a sorting into a number of categories.

Figure 2:
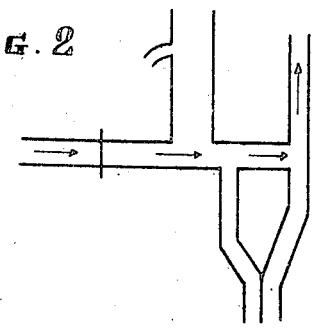

In order that the invention may be readily understood, illustrative embodiments of same more particularly adapted for the treatment of coal are, by way of example only, shown in the accompanying drawing, Fig. 1 being a diagrammatic view of one embodiment of the invention and Fig. 2 a diagrammatic view of a modification thereof. It will be assumed that the unclean coal containing slate or the like is classified according to volume by known means. Referring to Fig. 1, a suitable valve feeds the said coal in the dry or wet state to the conduit A; sinking slowly, the divided materials reach the point B in the stream $x'$; the clean coal remains in suspension in the said stream until evacuated at C, while the shale and mixed materials move along the bottom of the conduit until they reach the point D, at which point they sink through the still or "sleeping" column of water D'. When they reach the point E at the bottom of the column D' they go through the process again, that is to say that they are again sorted under the influence of the stream $x^2$ which carries the clean coal towards the outlet F while the waste, shale and the like is carried along the horizontal conduit until the point G is reached. The said waste then sinks through the still or "sleeping" column of water G' into the boot of the bucket elevator H.

The materials evacuated at C and F are collected and removed in the usual way.

In order to compensate the differences of water level which might be caused by the movements of the bucket chain and the evacuation of the waste, a conduit I connects the point $j$ of the feeding conduit A and the inside of the elevator casing. The supply of complementary water is fed into the said conduit I by means of the pipe $t$ and a constant level is secured by providing two overflows $r$, $r'$.

Fig. 2 shows the main portion of a second embodiment of the invention particularly suitable in cases where water is scarce, or when it is desired to obtain two categories of the higher specific gravity materials. As will be seen in the said embodiment, there is only a single stream but there are two discharge conduits for the materials of higher specific gravity. Any number of discharge conduits may be adopted, and they may moreover be combined with variations of the velocity of the stream obtained by modifying locally the cross-section of the stream conduit.

The accessory portions of the apparatus have not been illustrated in Fig. 2; they remain the same as those described above in connection with Fig. 1.

The advantages of the process forming the subject matter of the present invention are numerous:

1. The products obtained are very clean, and the absence of any friction leaves them their brilliancy and their original shape;
2. The apparatus take very little room and are quite well adapted to be arranged in batteries and to allow the provision of any accessory plant for feeding the materials, removing the treated products, etc.
3. The water and power consumption is smaller than in other systems. All mechanical devices which have been used hitherto may be dispensed with.
4. Waste is reduced to a minimum.
5. The regularity of the operation only depends from a single factor, e. g. the volume of the stream, and is therefore readily obtained and maintained.

I claim:

A plant comprising in combination: a series of horizontal conduits, a series of vertical conduits extending upwardly from the end of each of the said horizontal conduits, means for supplying water under pressure to the horizontal conduits and the upward conduits at the end thereof, a flooded vertical feeding conduit to receive the mixed materials to be treated and which delivers into the uppermost horizontal conduit, a series of vertical conduits adapted to contain water in the static state extending downwardly from the end of each horizontal conduit and delivering into the horizontal conduit immediately below except in the case of the lowermost, a bucket elevator adapted to collect the material discharged at the lower end of the vertical conduit extending downwardly from the end of the said lowermost horizontal conduit, and a suitable communication between the vessel formed by the casing of the said elevator and the aforesaid feeding conduit, by means of which any variations of the water level in the different parts of the plant are compensated.

In testimony thereof I signed hereunto my name in the presence of two subscribing witnesses.

MARCEL CROQUET.

Witnesses:
R. CROQUET,
Go. J. ZOLEARD.